A. BLOCK.
TYPESETTING MACHINE.
APPLICATION FILED OCT. 4, 1917.

1,335,217.

Patented Mar. 30, 1920.
5 SHEETS—SHEET 1.

Inventor:
Alexander Block

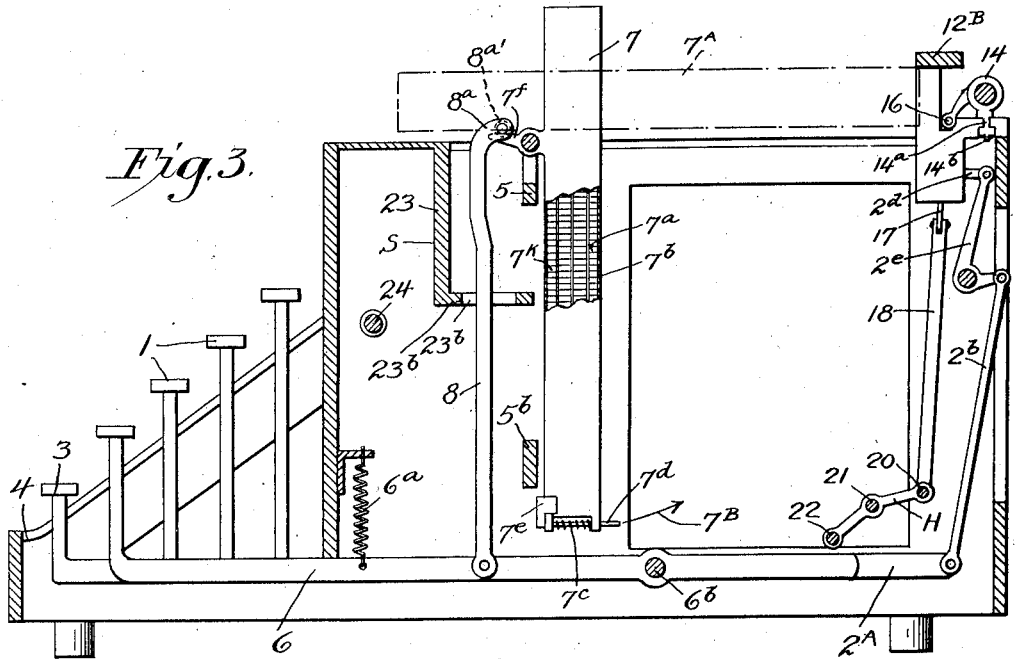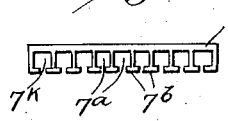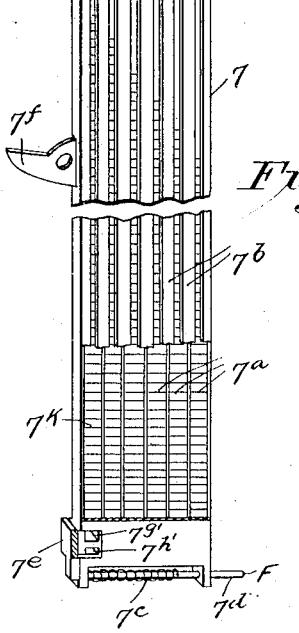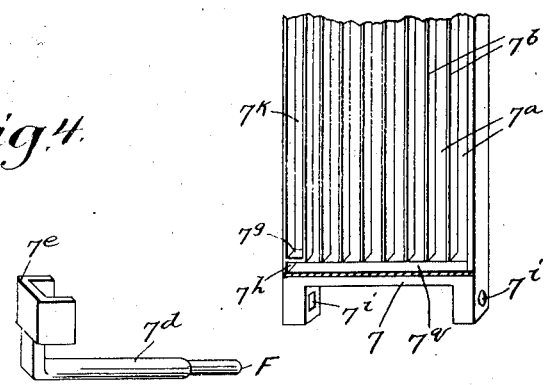

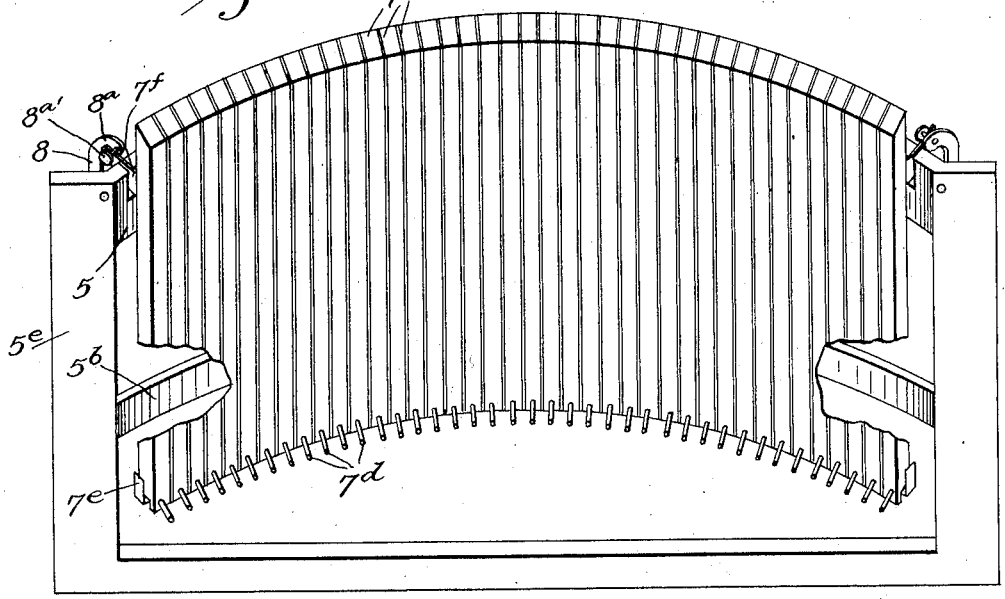
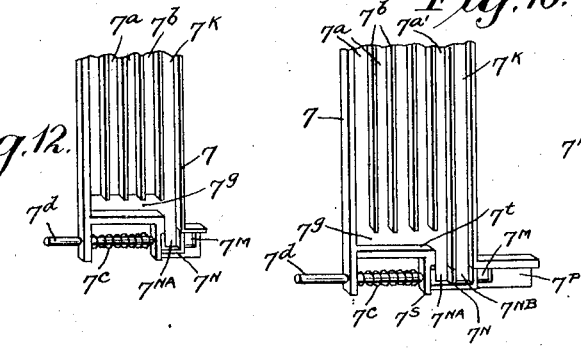
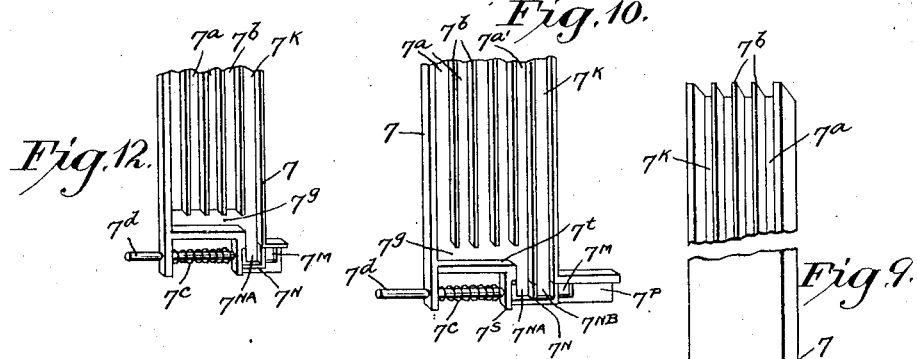
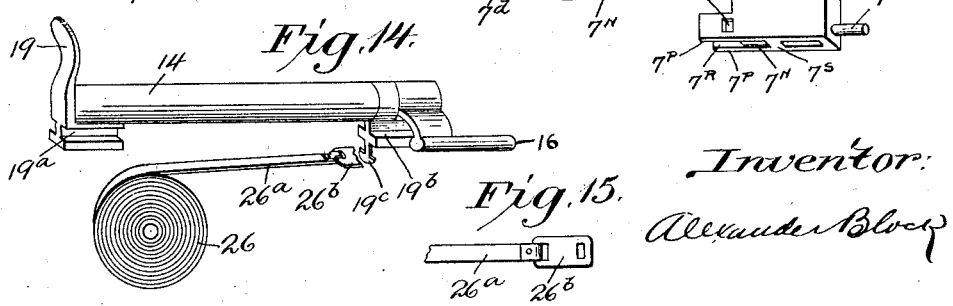
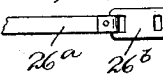

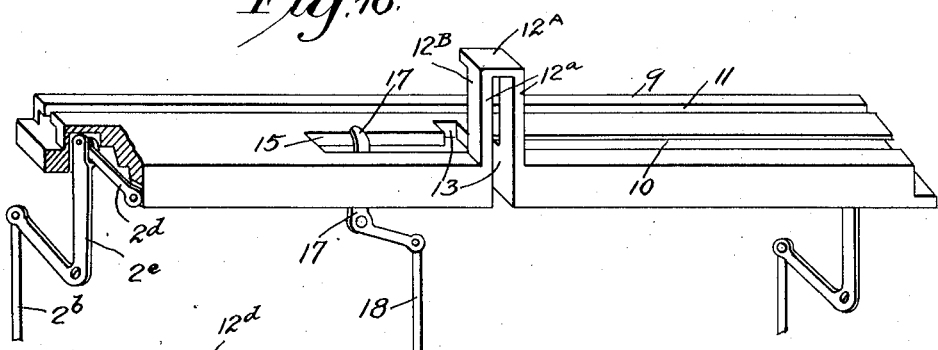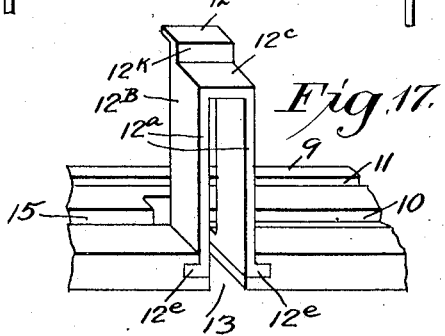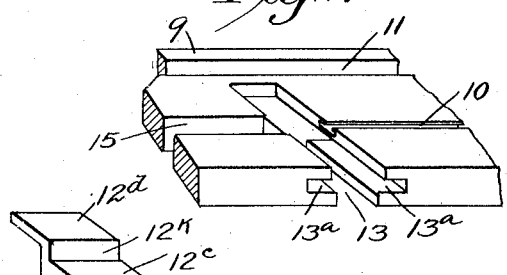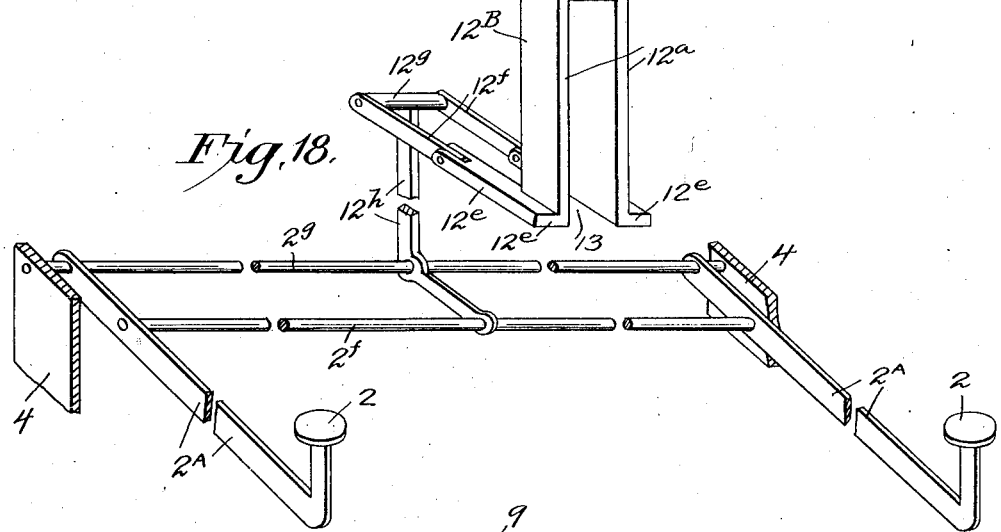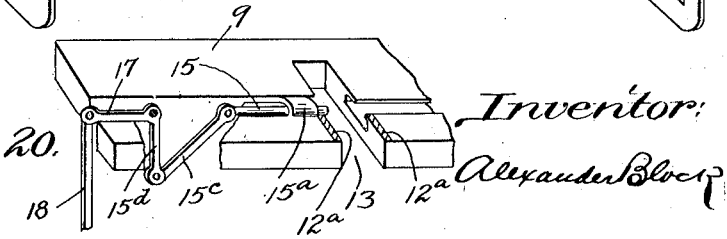

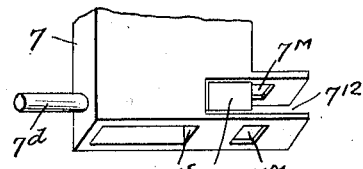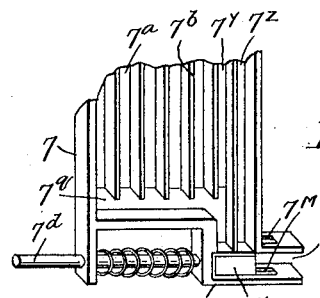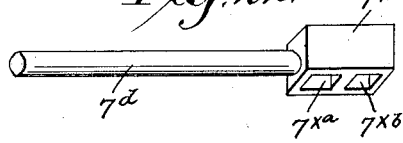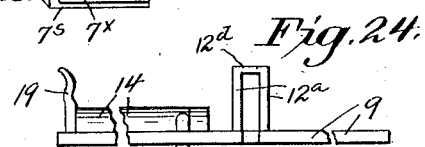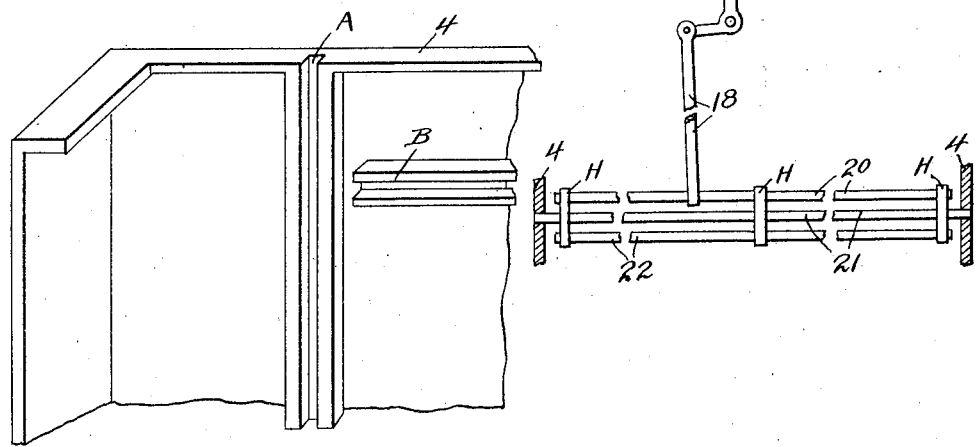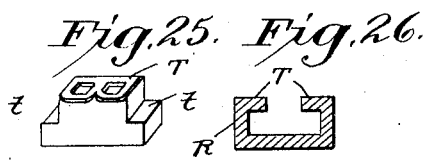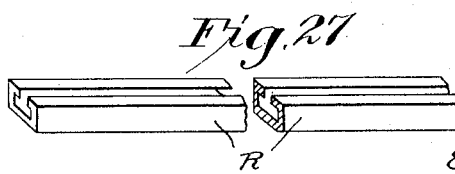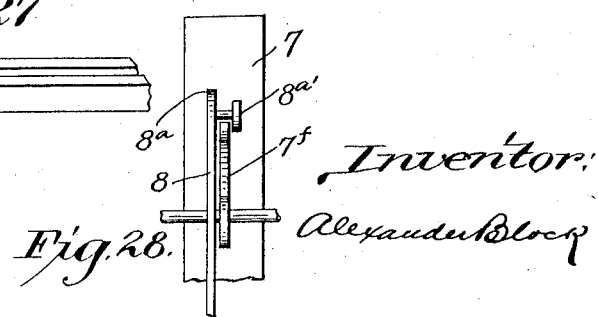

UNITED STATES PATENT OFFICE.

ALEXANDER BLOCK, OF NEW YORK, N. Y.

TYPESETTING-MACHINE.

1,335,217.   Specification of Letters Patent.   Patented Mar. 30, 1920.

Application filed October 4, 1917. Serial No. 194,723.

*To all whom it may concern:*

Be it known that I, ALEXANDER BLOCK, residing in the city of New York, borough of Manhattan, county and State of New York, have invented certain new and useful Improvements in Typesetting-Machines, of which the following is a full, clear, and exact description, such as will enable others skilled in the art to which it appertains to make and use the same.

This invention is a type-setting machine, and its object is more particularly, to provide in a machine of this kind, mechanism adapted to hold a maximum amount of type in a minimum of space; said invention consisting in providing said machine with a plurality of type bars adapted for holding movable type, said type bars being arranged radially of a segmental support and adapted to deliver types successively to a common point when actuated by mechanism operably connected with a keyboard.

My invention relates to a device by which type can be readily assembled or set on a type rod or the like to be used in a printing press either flat or rotary, said device being of compact construction, strong, durable and efficient; my invention consisting of the novel details of construction illustrated in the accompanying drawings and described in the specification wherein the various parts are designated by characters, like parts being designated by like characters throughout.

In one form of machine embodying my invention the type bars are adapted for holding different case type, the type bars being provided with a plurality of channels for holding columns of type, ejecting chambers being provided in the lower extremities of said type bars through which the types are expelled, a different ejecting chamber being provided for a different case type, escapement means for controlling the escape of types through said ejecting chambers, means being provided for delivering upper or lower case type, one at a time, as required, to a type holder supported on an assembling table, by the operation of the mechanism of the machine as controlled from a keyboard. However, the type bar may be arranged to hold only one case type and be provided with but one ejecting chamber; the machines embodying my invention shown in the accompanying drawings and described herein being intended for purposes of illustration rather than defining the limits of my invention, wherein—

Figure 1:
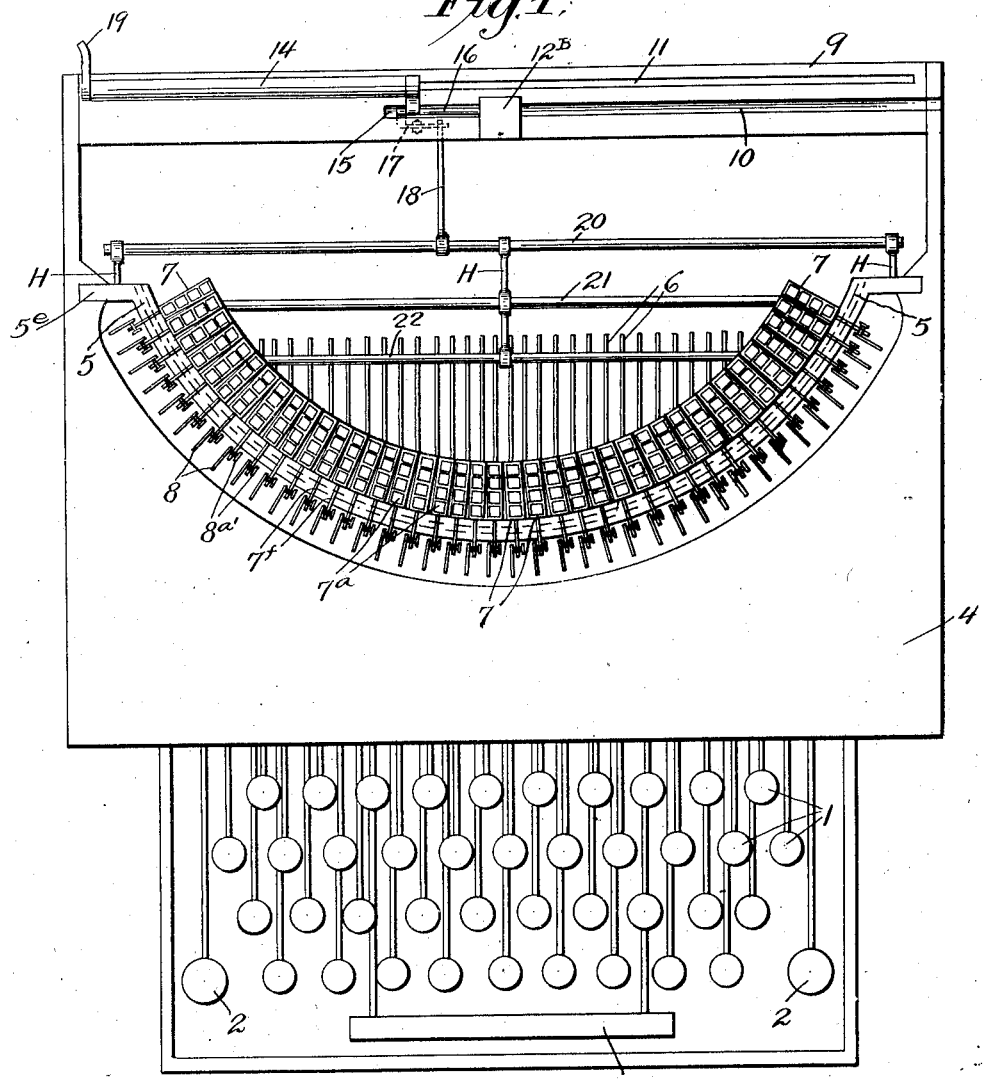
Figure 2:
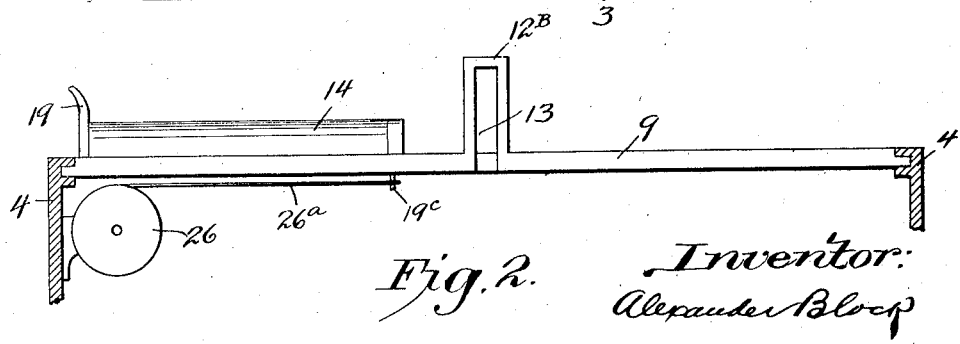

Figure 1 is a top plan view of the machine embodying my invention. Fig. 2 shows one type of assembling table. Fig. 3 is a vertical longitudinal section of the machine shown in Fig. 1, with parts broken away and parts omitted. Fig. 4 is a type bar holding movable type, parts broken across and parts removed. Fig. 5 is a top view of same. Fig. 6 shows inside view of said type bar with parts missing. Fig. 7 is type escapement device. Fig. 8 shows a plurality of type bars mounted on a segmental support with parts broken away. Fig. 9 is another type of type bar broken across and partly exposing the inside. Fig. 10 is inside view of same, parts broken away. Fig. 11 is its escapement device. Fig. 12 is same type of type bar adapted for holding single case type. Fig. 13 shows its escapement device. Fig. 14 is an independent ejecting device and the spring holding it in normal rest position. Fig. 15 is the attaching end of band connected with the spring. Fig. 16 shows perspective view of assembling table, partly broken across. Fig. 17 is a detail of the escapement actuator mounted on the assembling table parts of which are omitted. Fig. 18 shows said type of escapement actuator and its actuating means operably connected with its shift keys, parts broken away. Fig. 19 shows the type of assembling table adapted for housing said escapement actuator shown in Fig. 18 with parts omitted. Fig. 20 shows an assembling table with another type of ejecting mechanism. Fig. 20<sup>A</sup> shows the lower extremity of another type of type bar and its escapement device shown in Fig. 22. Fig. 21 is an inside view of the lower end of said type bar. Fig. 23 is part of machine frame. Fig. 24 is a plan view of the assembling table and the transferring mechanism, with parts omitted and other parts broken across. Fig. 25 is a perspective of one of the types. Fig. 26 shows a cross-section of a type holder. Fig. 27 is a type holder broken across. Fig. 28 shows means for actuating the type bars with parts broken away.

I will now describe the machine in detail:
The frame of the machine is of the usual construction in which the operative mechanisms are mounted. A spring-pressed key-lever, 6, is pivoted on a shaft $6^b$ running transversely across the machine frame, said key lever comprising an inner free end, and being provided at its outer end with a key stem affording attachment to a key, 1. A type bar, 7, is pivotally mounted upon a segmental support, 5, and comprises channels $7^a$ for holding lower case type and channel $7^k$ for upper case type, and a cam $7^t$ being provided for actuating type bar 7. A lever, 8, pivoted at its lower end to key lever 6, and embracing a hook at its upper extremity, which hook, $8^a$, is provided with a pin and guide $8^{a'}$ and is adapted for actuating cam $7^t$ to swing type bar 7 into position to deliver the required type one at a time, to the type holder 10 on assembling table 9. Said lever 8 being arranged to slide when operated or when returning to retracted position, in a slot $23^b$ provided for that purpose in support S attached to the machine frame. A type bar rest is designated by $5^b$. The segmental support comprises a curved, notched member, 5, upon which type bars 7 are pivotally mounted; flanges $5^e$ for mounting in machine frame, and type bar rest $5^b$. Channels $7^a$ of type bar 7 are open above, and empty below into a transverse channel $7^q$ which in turn feeds types one at a time to an ejecting chamber $7^h$ comprising escapement apertures $7^{h'}$ through which the types are expelled. Channel $7^k$ empties directly into an ejecting chamber $7^g$ which adjoins chamber $7^h$ and is also provided with escapement apertures $7^{g'}$ through which the upper case characters are expelled; the escape of the types from said apertures being controlled by an escapement device F, embracing a slidable member $7^d$ and a lug member $7^e$ provided with lateral standards adapted for being moved into and out of said apertures and normally closing same to prevent the escape of type therefrom; said slidable member being mounted in recesses $7^1$ provided for that purpose in projections on the lower extremity of the type bar 7; a spring $7^c$ tending to keep said escapement device in retracted position to close said apertures $7^{g'}$ and $7^{h'}$.

An assembling table, 9, is provided with a central slot 13, surmounted by an escapement actuator $12^B$; said escapement actuator embracing lateral standards $12^a$ and a horizontal roof or stop $12^A$; a type holder 10 is provided on said table 9, said type holder being in alinement with a slot 15; a flanged groove 11 being provided on said table for slidably mounting expelling device 14; said assembling table being mounted in grooves on the machine frame and adapted for slidable movement therein, means being operably connected therewith for shifting said table a distance for delivering that case type into the type holder 10 which is not delivered thereto while the table is in its unshifted position; said shifting means embracing a bell crank $2^e$, to one arm of which is pivotally attached a link $2^b$, the other end of which link is pivotally attached to a shift key lever $2^A$ operated by a shift key 2; to the upper arm of said bell crank $2^e$ is pivotally attached a lever $2^d$, the other end of which lever is pivotally attached to assembling table 9.

Ejecting mechanism 14 is mounted on the assembling table in groove 11 and is adapted for slidable movement therein, two feet on said ejecting mechanism $19^a$ and $19^b$, being provided for that purpose; said mechanism 14 comprising a body member, a push member 19, an expelling rod 16 which is housed in slot 15 and coöperates with a bell crank 17 to expel types one at a time from the type bar into the type holder when said type bar is delivered into the operative position; a hook $19^c$ on device 14 affording attachment to spring 26 which maintains said device 14 in its normal position; a link 18 is pivotally attached by its upper end to bell crank 17, and by its lower end pivotally attached to a rocking mechanism embracing a rocker shaft 21 running transversely across the machine frame and journaled therein; arms H being mounted on said shaft 21—one at either extremity thereof; the anterior extremities of arms H being connected by a bar 22 which overhangs the rear extremities of the key levers; the posterior ends of arms H being connected by a bar 20 on which the lower end of link 18 is pivotally mounted.

The operation is as follows:—
When a key is depressed, the anterior end of key lever 6 descends and its rear end ascends, lever 8 descends and bears down on cam $7^t$ forcing the type bar to swing into the operative position with reference to the assembling table 9 to deliver its lower extremity into slot 13, escapement device F coöperating with escapement actuator $12^B$ to open apertures $7^{g'}$ and $7^{h'}$ and to deliver the aperture holding the required type into alinement with type holder 10. The rear end of key lever 6 continuing its ascent forces arms H to rock and to move link 18 downward and to actuate bell crank 17 which coöperates with ejecting rod 16 to expel the type brought into alinement with the typeholder. When a line of type is set and it is desired to expel said type into a printing mechanism, it can be accomplished by manually sliding device 14 along groove 11 until the entire line is ejected, when the said device 14 is returned to retracted position by its spring 26. When it is required to set an upper case character the table is shifted by depressing the shift key and when the required key is depressed, the upper case character is delivered into alinement with the type holder and expelled therein by above-mentioned transferring means.

In Figs. 9, 10, 12, 20$^A$ and 21 are shown modified forms of type bars, the escapement mechanism of which embraces a slidable member 7$^d$ and a lug 7$^N$ comprising two chambers 7$^{NA}$ and 7$^{NB}$ which are normally in alinement respectively with a channel 7$^{a\prime}$ and a channel 7$^k$ which feed type one at a time to said chambers; a spring 7$^c$ tending to maintain said escapement device in retracted position; the slidable member 7$^d$ is mounted in projections on the lower end of the type bar 7 and adapted for slidable movement in said projections; lug 7$^N$ of the escapement device being housed in a chamber 7$^p$ in the lower extremity of said type bar; said chamber comprising apertures 7$^M$ through which the types are discharged one at a time; lug 7$^N$ being adapted to slide in chamber 7$^p$ to deliver chamber 7$^{NA}$ or 7$^{NB}$ into alinement with escapement apertures 7$^M$ when 7$^d$ is depressed by the escapement actuator during the operation of the type bar 7; a channel 7$^k$ adapted for holding upper case letters is in alinement with chamber 7$^{NB}$ of lug 7$^N$ and feeds upper case characters one at a time to said chamber; a channel 7$^{a\prime}$ adapted for holding lower case characters is in alinement with chamber 7$^{NA}$ of lug 7$^N$ and is adapted for feeding lower case characters to said chamber; channels 7$^a$ being adapted for holding reserve types which feed a transverse channel 7$^s$ while the type bar is in the resting position and feed types to chamber 7$^{NA}$ when channel 7$^{a\prime}$ had been emptied of types.

Fig. 12 is a form of type bar belonging to the type just described, but arranged to hold only single case type, differing from the above in that lug 7$^N$ comprises only one chamber 7$^{NA}$. In another type shown in Figs. 20$^A$, 21 and 22, the lug is designated 7$^x$ and embraces two feed chambers 7$^{xa}$ and 7$^{xb}$, differing from the above in that the types instead of being ejected laterally are ejected antero-posteriorly.

I have shown in the drawings several modifications of assembling tables and escapement actuators. In that type of machine embracing type bars adapted for holding single case type, the assembling table and escapement actuator may be fixed to the machine frame, as is shown in Fig. 20, wherein an expelling rod 15 is slidably mounted and adapted for expelling type from the type bar delivered into operative position; said rod being pivoted to one end of a link 15$^c$, the other end of which is pivoted to a bell crank 17 pivotally connected to link 18 which is operably connected with a keyboard. Where different case type is used either the entire assembling table is adapted for shifting as shown in Figs. 2 and 16, or the table may be fixed and the escapement actuator adapted for shifting as shown in Figs. 17, 18 and 19. Said shifting escapement actuator 12$^B$ embraces two lateral vertical standards 12$^a$, feet 12$^e$ attached to lower faces of said lateral standards, and a top connecting the upper extremities of said standards, said top comprising a horizontal stop 12$^c$ which comprises a vertical ledge 12$^k$ to the upper face of which is attached another horizontal stop 12$^d$ parallel to 12$^c$ but on a higher level; feet 12$^e$ are pivoted to links 12$^f$, the other ends of which are pivotally attached to a cross-piece 12$^g$ mounted on a bell crank 12$^h$ which is mounted on a rocker shaft 2$^g$ journaled in machine frame 4; shift key levers being also pivotally mounted on said rocker shaft 2$^g$; the other arm of bell crank 12$^h$ being mounted on a bar 2$^f$ which runs parallel to rocker shaft 2$^g$ and connects the shift key levers 2$^A$; to the end that when a shift key is depressed escapement actuator 12$^B$ is shifted in grooves 13$^a$ on the assembling table 9 to bring stop 12$^d$ into operative position to coöperate with escapement mechanism 7$^N$ as shown in Figs. 9 and 10 for depressing said escapement device a distance to deliver chamber 7$^{NB}$ into alinement with escapement aperture 7$^M$, the further movement upward of said type bar being arrested by stop 12$^c$, the expelling means then ejecting the type into type holder 10. Normally stop 12$^c$ coöperates with the escapement device 7$^N$ to deliver chamber 7$^{NA}$ into alinement with aperture 7$^M$ for feeding lower case types one at a time to said type holder.

Having now fully described my invention, what I claim as new and desire to secure by Letters Patent, is:—

1. In a type-setting machine, a type bar arranged to hold a plurality of movable types, a type channel, means for actuating said type bar, and means for delivering types from said type bar to said type channel.

2. In a type-setting machine, a type bar adapted for holding a plurality of movable types, a type channel, means for moving said type bar into operative position, and means for ejecting types from said type bar to said type channel.

3. In a type-setting machine, a type bar arranged to hold a plurality of movable types, a type channel, means for moving said type bar into operative position, and means for ejecting types, one at a time, from said type bar to said type channel.

4. In a type-setting machine, a type bar adapted for holding a plurality of movable types simultaneously, a type channel, means for delivering said type bar into operative position with reference to said type channel, and means operably connected with said delivering means for successively ejecting the types from said type bar into said channel.

5. In a type-setting machine, a type bar, channels on said type bar adapted for holding movable types, an assembling table, a type channel supported thereon, means for moving said type bar into operative position, and means operably connected with said type bar actuating means for expelling types one by one from said type bar into said type channel.

6. In a type-setting machine, a type bar, parallel type-holding channels on said type bar, an assembling table, a type channel supported thereon, means for moving said type bar into operative position with reference to said type channel, and means operably connected with said type bar actuating means for successively delivering type from said type bar to said type channel.

7. In a type-setting machine, a type bar, channels on said type bar arranged to hold movable types, escapement means for controlling the ejection of types from said channels, means for actuating said type bar to bring it into operative position, an assembling table, a type channel supported thereon, and means for transferring types, one at a time, from said type bar to said type channel upon delivery of the type bar into operative position with reference to said type channel.

8. In a type-setting machine, a type bar, one or more channels on said type bar arranged to hold types, one or more recesses to which types are successively fed from said channels, apertures in said recesses, escapement means for controlling the escape of types through said apertures, an assembling table, a type holder supported thereon, means for moving said type bar into operative position with reference to said type holder, means for actuating said escapement means to open said escapement apertures, and means for ejecting types, one at a time, from said type bar through said apertures into said type holder.

9. In a type-setting machine, a type bar arranged to hold a plurality of movable types simultaneously, means on said type bar operably connected with a finger key for moving said type bar into operative position, escapement means on said type bar, an assembling table, a type holder supported thereon, means on said table coöperating with the type bar to actuate said escapement means to allow of the ejection of types from said type bar into said type holder, and means for expelling types from said type bar into said type holder.

10. In a type-setting machine, a plurality of type bars adapted for holding movable types, mechanical means for moving said type bars into operative position, means for controlling the escape of types from said type bars, an assembling table, a type holder mounted thereon, means mounted on said table coöperating with said type bars to actuate said escapement means to allow of transferring of the type from said type bars to said type holder, and means operably connected with said type bar actuating means for ejecting the type from said type bars into said type holder.

11. In a type-setting machine, a plurality of type bars pivotally mounted upon a segmental support, said type bars being arranged for holding movable types, mechanical means for moving said type bars into operative position, escapement mechanism operably connected with said type bars for controlling the escape of types from said bars, an assembling table, a type holder mounted thereon, an escapement actuator also mounted on said table and coöperating with said type bars to actuate said escapement means to allow of the transferring of the type from the type bars to said typeholder, and means operably connected with said type bar actuating means for expelling type from said type bars to said type holder.

12. In a type-setting machine, a plurality of type bars severally pivoted upon a segmental support, each of said type bars being arranged to hold movable types, mechanical means for severally swinging said type bars into operative position, escapement mechanism operably connected with each type bar for controlling the escape of types therefrom, an assembling table, a type holder mounted thereon, an escapement actuator mounted on said table and coöperating with each of said type bars to actuate said escapement mechanism to allow of the ejection of type from said type bar to said type holder upon the delivery of the bar into the operative position, and means for successively expelling type from the type bars into said type holder.

13. In a type-setting machine, an assembling table, a type holder supported thereon, a plurality of type bars severally pivoted upon a segmental support, one or more channels on said type bars arranged to hold types, one or more chambers in said type bars operably connected with said channels and adapted to receive types therefrom, escapement apertures in said chambers, escapement means mounted on said type bars and adapted for controlling the escape of types through said apertures, mechanical means for severally swinging said type bars into the operative position with reference to said assembling table, an escapement actuator mounted on said table coöperating with the type bar to actuate said escapement mechanism to allow of the escape of type from said type bar into said type holder upon the delivery of said escapement apertures into alinement with said type holder, and means operably connected with the type bar actuating means for successively expelling type from said type bars into said type holder.

14. In a type-setting machine, a plurality of type bars severally pivoted upon a segmental support, a plurality of type holding channels on said type bars, feed chambers operably connected with said channels in each type bar, escapement apertures in said feed chambers, an escapement mechanism operably connected with each type bar and adapted for normally closing said escapement apertures, an assembling table, a type holder supported thereon, individual means for severally swinging said type bars into operative position with reference to said type holder to deliver said apertures into alinement with said type holder, an escapement actuator on said assembling table for coöperating with said type bars to operate said escapement mechanism to open the escapement apertures, and means for expelling the types successively from said type bars through the apertures into said type holder.

15. In a type-setting machine, a plurality of pivotally mounted type bars, sets of parallel type-holding channels on each type bar, a feed chamber operably connected with each set of channels and adapted to receive types, one at a time, from said sets of channels, escapement apertures in said feed chambers, an escapement device on each type bar for normally closing said apertures to prevent the escape of types therefrom, an assembling table, a type holder on said table, mechanical means for swinging said type bars severally to deliver the feed chamber containing the required type into alinement with said type holder, an escapement actuator on said assembling table coöperating with said type bar to actuate said escapement device to open the feed chamber and allow of the ejecting of the type therefrom, and means for expelling said type into the type holder.

16. In a type-setting machine, a plurality of type bars severally pivoted upon a segmental support, type-holding channels on said type bars, feed chambers operably connected with said channels and adapted to successively receive types from said channels, escapement apertures in said feed chambers, an escapement device including a slidable member and a lug member, said slidable member being mounted in the type bar and adapted for slidable movement therein, said lug member being attached to the slidable member and arranged to move into and out of said escapement apertures, means for normally maintaining said escapement device in a position to close said apertures, an assembling table, a type holder on said table, an escapement actuator on said table, means for actuating the type bars individually to deliver one of the feed chambers thereof into alinement with said type holder, the escapement actuator coöperating with said type bar to operate the escapement device and open said escapement apertures to allow of the transferring of the type, and means for ejecting the type from said feeding chamber into said type holder.

17. In a type-setting machine, a plurality of individually pivoted type bars, a plurality of type-holding parallel channels on said type bars, feed chambers operably connected with said channels and adapted to receive types—one at a time—from said channels, escapement apertures in said feed chambers, an escapement device including a slidable member and a lug member, said slidable member being mounted in projections in the type bars and adapted for slidable movement therein, the lug member being attached to said slidable member and arranged to move into and out of said escapement apertures, a spring for normally maintaining the escapement device in retracted position to close said escapement apertures, an assembling table, an escapement actuator mounted thereon, a type holder on said table, means operably connected with a keyboard for severally actuating the type bars to deliver the feed chamber holding the required type into alinement with the type holder, said escapement actuator coöperating with said type bars severally to operate the escapement device against the action of its spring and to open said escapement apertures to allow of the transferring of the type from said feeding chamber through said escapement apertures into said type holder.

18. In a type-setting machine, a plurality of type bars individually pivoted upon a segmental support, sets of type-holding channels on each of said type bars, feed chambers in said type bars operably connected with said channels, one feed chamber with each set of channels, each feed chamber being arranged to receive types—one at a time—from the set of channels with which it is operably connected, escapement apertures in each feed chamber, an escapement mechanism including a slidable member and a lug member for controlling the escape of types from said apertures, said slidable member being mounted in the type bar and adapted for slidable movement therein, the lug member being attached to said slidable member and arranged to move into and out of said escapement apertures, means for normally maintaining said escapement mechanism in a position to close said apertures, an assembling table, a type holder on said table, an escapement actuator attached to said table, means operably connected with a key board for actuating severally said type bars to deliver either one of the feed chambers of said type bar into alinement with the type holder, means being provided in connection with said assembling table to move said table a distance to bring said type holder into alinement with that feed chamber of the type bar which is normally not brought into alinement therewith when the assembling table is maintained in retracted rest position, said escapement actuator coöperating with the type bar to operate the escapement device and open the escapement apertures to allow of the transferring of the type, and means for ejecting the type from said feeding chamber into said type holder.

19. In a type-setting machine, a plurality of type bars severally pivoted upon a segmental support, sets of parallel type-holding channels on each type bar, a feed chamber operably connected with each of said sets of channels and adapted to receive types successively from the set of channels with which it is operably connected, escapement apertures in each feed chamber, an escapement mechanism for controlling the escape of type from said apertures, an assembling table, a type holder on said table, an escapement actuator mounted on said table, means for swinging said type bars into the operative position with reference to said assembling table, the escapement actuator coöperating with the type bar during its movement toward the operative position to actuate said escapement mechanism and to open the feed chambers, said type bar actuating means being adapted to deliver one of said feed chambers into alinement with the type holder while said assembling table is in retracted position, shifting mechanism for moving said table a distance to allow of the delivering of said type holder into alinement with the other of said feed chambers when it is desired to set a type held in said chamber, and means operably connected with said type bar actuating means and controlled from a keyboard for ejecting the type in alinement with said type holder from said feed chamber through said escapement apertures into the type holder.

20. In a type-setting machine, a plurality of pivoted type bars, a plurality of parallel channels on each type bar arranged to hold sets of type, feed chambers operably connected with said channels, one feed chamber with each set and adapted to receive types successively from said set, escapement apertures in said feed chambers, an escapement mechanism slidably mounted on each type bar for controlling the escape of type from said feed chambers through said escapement apertures, an assembling table mounted on the machine frame and adapted for slidable movement thereon, a type holder and an escapement actuator on said table, means for swinging severally said type bars to deliver one of said fuel chambers into alinement with said type holder while the assembling table is maintained in retracted rest position, means operably connected with shift keys for moving said table a distance to bring the type holder into alinement with the other of said feed chambers of the type bar when it is required to set a type contained in said other feed chamber, said escapement actuator coöperating with said type bar to actuate said escapement mechanism to open said feed chambers to allow of the ejection of the type, and means for expelling the type into said type holder.

21. In a type-setting machine, a plurality of type holding type-bars, escapement apertures in said type bars, an escapement device on each of said type bars for controlling the escape of type from said bars through said apertures, an assembling table, a type holder on said table, means operably connected with a keyboard for moving said type bars into a position to deliver one of the feed chambers into alinement with said type holder, means for shifting said table a distance to allow of the delivery by said type bar of that feed chamber into alinement with said type holder which is normally not delivered into alinement therewith while the table is in retracted position, an escapement actuator on said table for coöperating with the type bars severally to actuate said escapement mechanism to open said feed chambers and allow of the ejection of the type from said feed chamber through the apertures into said type holder, a stop on said escapement actuator for arresting the upward movement of the type holder after it had delivered the desired feed chamber into alinement with the type holder, and means operably connected with said type bar actuating means which are adapted to continue their movement inward subsequently to the arrest of said type bar by said stop, for ejecting the type into said type holder.

22. In a type-setting machine, a plurality of type bars pivotally mounted on a segmental support, and adapted for holding movable types, an escapement mechanism for controlling the escape of types from said type bars, an assembling table, a type holder on said table, a cam on each type bar, a lever operably connected with said cam on each type bar and with a keyboard for swinging said type bars severally toward said table to deliver types successively to said type holder, an escapement actuator on said table for severally actuating the escapement means on each type bar to allow of the ejection of types into said type holder, and means for expelling the type into said holder, yielding means being provided to allow the type bar actuating means to move farther inward and to operate said type expelling means.

23. In a type-setting machine, a plurality of type bars severally pivoted upon a segmental support, channels on said type bars adapted for holding types, feed chambers operably connected with said type holding channels and adapted for receiving types successively from said channels with which they are operably connected, escapement apertures in said feed chambers, an escapement mechanism mounted on each type bar and adapted to normally close said apertures, means for maintaining said escapement mechanisms in retracted position, an assembling table, a slot centrally located thereon, a type holder on said table, a cam on each type bar, a lever operably connected with said cam of each type bar, each lever being pivotally attached to a key lever, and each key lever embracing a finger key, which when depressed by an operator forces the type bar with which it is operably connected to swing toward said assembling table to deliver its operative end into said central slot and the feed chamber holding the type required to be set, into alinement with said type holder, said type bar coöperating with an escapement actuator mounted on said table to actuate the escapement mechanism to open the escapement apertures to allow of the ejection of the type from said chamber, a stop on said escapement actuator for arresting the further upward progress of the type bar after said feed chamber had been delivered into alinement with said type holder, means for ejecting said type into said type holder, and yielding connections between the type bar actuating means to allow said actuating means to continue their travel inward subsequent to arrest of the type bar by said stop, to operate said ejection means to eject the type into the type holder.

24. In a type-setting machine, a plurality of pivotally mounted, type-holding type bars, an escapement mechanism on each type bar for controlling the escape of types therefrom, an assembling table, a type holder on said table, means for swinging said type bars severally into the operative position with reference to said type holder to deliver a type at a time into alinement therewith, said type bars severally and successively coöperating with an escapement actuator mounted on said table to actuate said escapement mechanism to allow of the ejection of the type from said bar into said type holder, means for expelling said type into said type holder, and yielding connections between said type bars and their actuating means allowing of their further movement inward of said actuating means subsequently to the delivery of said type bar into operative position, a universal bar actuated by said type bar actuating means in their further inward progress, said universal bar being operably connected with said expelling means to actuate said means for expelling the type from the type bar into said type holder.

25. In a type-setting machine, a plurality of type bars adapted for holding movable type, means for severally actuating said type bars to successively deliver types from said type bars to a type holder, a universal bar operably connected with said type bar actuating means, an ejecting rod, a link connecting said ejecting rod with said universal bar, said ejecting rod being adapted to expel type from the type bar brought into operative position by the operation of the mechanisms of the machine as controlled from a keyboard.

26. In a type-setting machine, a plurality of type bars adapted for holding movable type, means for severally actuating said type bars to successively deliver types from said bars to a type holder, a universal bar operably connected with the type bar actuating means, a type transferring device, an ejecting rod connected therewith and adapted to eject type into the type holder, means connected with said ejecting rod and a link connecting said means with the universal bar, all to the purpose of transferring type from the type bar brought into operative position into said type holder by the operation of the mechanisms of the machine as controlled from a keyboard, and means for returning said transferring device to retracted rest position subsequently to the expelling of the type into the type holder.

27. In a type-setting machine, a plurality of type-holding type bars severally pivoted upon a segmental support, means for successively swinging said type bars toward a type holder, to deliver types one by one into said type holder, means operated by said type case actuating means for inserting the type into said type holder, a plurality of key levers, one for each type bar with which they are operably connected, and yielding connections between said type bar actuating means to allow of said actuating means to actuate the type transferring means.

28. In a type-setting machine, a plurality of pivotally mounted, type-holding type bars, means for moving said type bars into operative position with reference to a type channel, to deliver types one at a time to said channel, a plurality of key levers, one key lever for each type bar, through which power is transmitted for the operating of all of said means, and independent means including a push member and an ejecting rod for expelling one type at a time into said type channel, and also from said channel to expel types onto a printing device, means controlled from a keyboard operably connected with said ejecting rod to actuate said ejecting means and to force said rod to expel one type at a time from a type bar to said type channel, and when the required number of types had been ejected into said channel, said independent means is arranged to expel said types from said channel onto a printing device, and means for returning of said independent device to retracted rest position subsequently to the ejection of the types.

29. In a type-setting machine, a plurality of type-holding type bars severally pivoted upon a segmental support, mechanical means for severally actuating said type bars to successively deliver types one at a time from said type bars into a type holder, means operably connected with said type bar actuating means for expelling said types one by one into said type holder, and independent means for expelling a line of type from said type holder onto a printing device, and a spring for returning of said independent means to retracted rest position.

30. In a type-setting machine, a plurality of type-holding type bars severally pivoted upon a segmental support, said segmental support being arranged to move into and out of the machine frame, means for swinging said type bars severally and radially of said segmental support to deliver types to a common point, a type holder into which said types are successively delivered by the operations of the various mechanisms of the machine as controlled from a keyboard, and means for ejecting said types successively into said type holder and from said type holder onto a printing device.

31. In a type-setting machine, a plurality of pivotally mounted type bars, one or more sets of channels on said type bars adapted for holding type, means for feeding said type, an escapement device to which said type is fed successively from said channels, said device including a slidable member and a lug member, one or more feed chambers in said lug member which are normally in alinement with said sets of channels, one feed chamber in alinement with one channel of each set of channels and adapted for successively receiving types therefrom, escapement apertures normally not in alinement with said feed chambers, means for normally maintaining escapement device in retracted position with the feed chambers in alinement with their corresponding channels and out of alinement with said escapement apertures, means for actuating said type bars successively to deliver said escapement apertures into alinement with a type holder on an assembling table, said type bar coöperating with an escapement actuator on said table to actuate the escapement mechanism to deliver one of the feed chambers into alinement with said apertures to allow of the expelling of the type into said type holder, and means for ejecting said type into said type holder.

32. In a type-setting machine, a plurality of type-holding type bars severally pivoted upon a segmental support, two sets of type-holding channels on said type bars, an escapement mechanism on each bar and including a slidable member and a feed member, said feed member embracing two feed chambers normally in alinement with a channel from each set of channels, one feed chamber with one set from which they are adapted to receive types one at a time, escapement apertures in the operative end of each type bar normally not in alinement with said feed chambers, a spring for maintaining said escapement mechanism in retracted position, mechanical means controlled from a keyboard for successively actuating said type bars to deliver said escapement apertures into alinement with a type holder on an assembling table, an escapement actuator including horizontal stops on different levels coöperating with said type bars to actuate said escapement mechanism a distance to deliver one or the other of its feed chambers into alinement with said type holder, said escapement actuator being slidably mounted in the assembling table and operably connected with shift keys to allow of the shifting of said escapement actuator a distance to move that horizontal stop into the operative position which is normally not in said position while the table is in retracted position, all to allow of the moving of the escapement mechanism a distance in the type bar to deliver into alinement with the escapement apertures that feed chamber which is not brought into alinement therewith when the escapement actuator is in retracted position to allow of the ejection of the type contained in said feed chamber, and means for ejecting the type into the type holder.

In testimony that I claim the foregoing as my invention I affix my signature, in presence of two witnesses, this 25th day of September, 1917.

ALEXANDER BLOCK.

Witnesses:
  ALBERT I. BLOCK,
  ROSE BLOCK.